(12) United States Patent
Capofreddi

(10) Patent No.: US 7,308,032 B2
(45) Date of Patent: Dec. 11, 2007

(54) OVERSAMPLING D/A CONVERTER AND METHOD FOR SHAPING NONLINEAR INTERSYMBOL INTERFERENCE IN AN OVERSAMPLING D/A CONVERTER

(75) Inventor: Peter Capofreddi, San Francisco, CA (US)

(73) Assignee: HRL Laboratories, LLC, Malibu, CA (US)

(*) Notice: Subject to any disclaimer, the term of this patent is extended or adjusted under 35 U.S.C. 154(b) by 827 days.

(21) Appl. No.: 10/749,575

(22) Filed: Dec. 31, 2003

(65) Prior Publication Data
US 2005/0141659 A1 Jun. 30, 2005

(51) Int. Cl.
*H04B 14/06* (2006.01)

(52) U.S. Cl. ............... 375/247; 375/348; 375/216; 341/143

(58) Field of Classification Search .......... 375/348, 375/216, 247; 341/143
See application file for complete search history.

(56) References Cited

U.S. PATENT DOCUMENTS

| | | | |
|---|---|---|---|
| 6,005,505 A | 12/1999 | Linz | 341/143 |
| 6,727,832 B1 * | 4/2004 | Melanson | 341/143 |
| 6,822,594 B1 * | 11/2004 | Melanson et al. | 341/143 |

OTHER PUBLICATIONS

Adams, R., et al., "A 113-db SNR Oversampling DAC with Segmented Noise-Shaped Scrambling," *IEEE Journal of Solid-State Circuits*, vol. 33, No. 12, pp. 1871-1878 (Dec. 1998).

Adams, R., et al., "Stability Theory for $\Delta\Sigma$ Modulators," *Delta-Sigma Data Converters*, IEEE Press, New Jersey, pp. 141-152 (1997).

Proakis, J.G., et al., *Communication Systems Engineering*, Prentice Hall, New Jersey, pp. 276-282 (1994).

Rugh, W., *Nonlinear System Theory: The Volterra/Wiener Approach*, Johns Hopkins University Press, London, pp. 253-255 (1981).

Su, D.K., et al., "A CMOS Oversampling D/A Converter with a Current-Mode Semi-Digital Reconstruction Filter," *IEEE International Solid-State Circuits Conference*, pp. 230-231 (1993).

Weiner, D., et al., *Sinusoidal Analysis and Modeling of Weakly Nonlinear Circuits with Application to Nonlinear Interference Effects*, Van Nostrand Reinhold Company, New York, pp. 82-84 (1980).

* cited by examiner

*Primary Examiner*—Phuong Phu

(57) ABSTRACT

A method and a device for spectrally shaping nonlinear intersymbol interference (NLISI) in an oversampling digital-to-analog converter are disclosed. At least one higher-order shaper circuit is provided, so as to shape NLISI, causing energy associated with NLISI to fall outside a signal band. The signal-to-noise ratio achieved is better than signal-to-noise rations obtained in prior art NLISI reducing methods and devices.

20 Claims, 4 Drawing Sheets

OVERSAMPLING D/A CONVERTER AND METHOD FOR SHAPING NONLINEAR INTERSYMBOL INTERFERENCE IN AN OVERSAMPLING D/A CONVERTER

BACKGROUND OF THE INVENTION

1. Field of the Invention

The present invention relates to digital-to-analog converters (DACs), and in particular to an oversampling DAC and to a method for shaping nonlinear intersymbol interference (NLISI) in an oversampling DAC.

2. Related Art

Oversampling DACs are becoming increasingly prevalent due to the favorable position they achieve in the trade-off among bandwidth, dynamic range and implementation complexity. These converters may be broadly classified into discrete-time and continuous-time implementations. The latter are usually favored in high frequency and high bandwidth applications such as the processing of radio and radar signals. See, for example, S. Norsworth, R. Schreier & G. C. Temes (Editors), Delta-Sigma Data Converters, IEEE Press, New Jersey, 1997.

A typical prior art oversampling DAC comprises (i) a digital signal processor that spectrally shapes quantization noise using delta-sigma modulation, (ii) one or more unit-elements that perform the digital-to-analog conversion function, and (iii) an analog filter. The unit elements, together with being components of the overall DAC, are also DACs themselves. The precision of the input to each unit element DAC is one bit. The dynamic range of the overall converter is limited by the characteristics of the individual unit element DACs.

In implementations that use more than one unit element, methods have been used to spectrally shape the mismatch between unit elements in such a way that it does not affect the dynamic range of the overall converter.

For example, FIG. 1 shows an oversampling DAC implemented in accordance with the prior art. The DAC of FIG. 1 comprises: a digital signal processor 1 that spectrally shapes quantization noise using delta-sigma modulation. The digital signal processor 1 comprises: a quantizer 4 that converts a multi-bit digital input signal to a single-bit representation; a first digital filter $H_1(z)$ 5 that performs the spectral shaping, i.e. filtering, of the quantizer output; a second digital filter $G(z)$ 6 that performs the spectral shaping of the input signal x[n]; and a summer 7 that combines the filtered input signal with the filtered quantizer output. The oversampling DAC also comprises a unit-element DAC 2 that performs the digital-to-analog conversion function. See, for example, Su and Wooley: "Semi-digital reconstruction filter", ISSCC 1993, pp. 230-231. The oversampling DAC also comprises an analog filter $V(s)$ 3 that attenuates the out-of-band quantization noise.

For a more detailed explanation of delta-sigma modulation, reference can be made to John G. Proakis, Masoud Salehi: "Communication Systems Engineering", Prentice Hall 1994, pp. 279-282. More specifically, delta-sigma modulation is a combination of oversampling and feedback, leading to suppression of quantization noise at the low-frequency end of the spectrum. Further prior art details on oversampling DACs can be found in U.S. Pat. No. 6,005,505 and in the references cited therein.

The error mechanism that limits the performance of each of the prior art unit element DACs, and thus the dynamic range of the overall converter, is nonlinear intersymbol interference (NLISI). NLISI arises from nonidealities in the DAC that cause its present output to depend not only on the present sample but also on previous samples of its input.

The primary sources of NLISI are 1) asymmetric rise and fall times in the output waveform, and 2) variation in transition times resulting from the residual effects of prior symbols. NLISI can be accurately represented by the Volterra model, in which the output of the DAC at specified sample times y(nT) is expressed as a function of the present and previous samples of the one-bit quantized signal, u[n], u[n−1], u[n−2], . . . .

$$y(nT)=a\cdot u[n]+b\cdot u[n-1]+c\cdot u[n-2]+d\cdot u[n]\cdot u[n-1]+e\cdot u[n]\cdot u[n-2]+f\cdot u[n-1]\cdot u[n-2]+g\cdot u[n]\cdot u[n-1]\cdot u[n-2]+ \quad (1)$$

where a, b, c, d, e, f and g represent coefficients whose value depends on the specific implementation of the DAC. The first three terms of equation (1) have a linear dependence on the input and do not degrade the performance of the modulator. The additional terms represent nonlinear intersymbol interference (NLISI), which degrades the performance of the modulator. For notational convenience, the two possible values of the one-bit quantized signal u[n] are represented by +1 and −1. A reference expressing NLISI in terms of a Volterra model is, for example, Nonlinear System Theory: The Volterra/Wiener Approach, Johns Hopkins University Press 1981, pp. 253-255.

The simulated output spectrum of a prior art oversampling DAC with NLISI in the unit element is shown by the solid curve of the graph in FIG. 2, which relates to a quiescent input (zero input) case. The horizontal axis of the graph represents frequency and is scaled logarithmically. The vertical axis represents spectral density in decibels. The dashed curve shows, for comparison, what the output spectrum would be in the absence of NLISI. The magnitude of the NLISI in the calculations used to generate FIG. 2 would result from approximately a 1% asymmetry between rise and fall times in the output of the unit element DAC. In this example, NLISI reduces the dynamic range of the converter by approximately 60 dB.

A known method of addressing NLISI makes use of various "return-to-zero" waveforms to increase the spacing between adjacent symbols. For example, nonlinear intersymbol interference caused by asymmetric rise and fall times has been addressed by R. Adams in "A 113 dB SNR oversampling DAC with segmented noise shaped scrambling", IEEE J. Solid State Circuits, vol. 33 no. 12, pp. 1871-1878 (December 1988). A "dual return-to-zero" scheme is described therein, which generates two data streams from the input data stream. Both data streams represent the same data word, but are offset from each other by half clock cycle. During the opposite half cycle each data stream is returned to zero. Each of the two data streams is applied to a separate digital/analog converter and the results are summed together. This mechanism separates adjacent data words by half cycle within each data stream and thereby reduces NLISI from the adjacent sample.

However, a first disadvantage of the methods using "return-to-zero" waveforms is that they reduce NLISI only insofar as it originates in the immediately preceding symbol and have no effect on longer-term interference. A second disadvantage is that these methods generate high frequency tones in the output spectrum. A further disadvantage is that these methods result in an increased sensitivity to clock jitter. In particular, with reference to the half cycle separation between adjacent data words, this is not sufficient to reduce NLISI to an acceptable level in systems with a very high clock rate. The clock rate used in the prior art is 2.56

MHz, which is very low when compared to the clock rates greater than 1 GHz required in radio and radar applications. Furthermore, the prior art does not provide any correction for the mismatch between the digital/analog subconverters. This mismatch generates a tone that is sufficiently far out-of-band in the example described by the prior art. In other applications, however, the tone generated by mismatch can be problematic.

SUMMARY OF THE INVENTION

The present invention overcomes the prior art drawbacks, by providing an apparatus and a method for spectrally shaping NLISI in such a way that most of its energy falls outside of the signal band.

In particular, the apparatus and the method according to the present invention are implemented by adding a plurality of shaper circuits to the delta-sigma modulator. In these additional shaper circuits, the NLISI is calculated from the history of signal bits using a Volterra model, and then filtered in such a way that the portion of the NLISI within the signal band is isolated. Changes are then made to the single-bit sequence in such a way that the sequence will generate additional NLISI that cancels the in-band portion of the NLISI already generated. Such changes are made using a multiport quantizer instead of the single port quantizer 4 of FIG. 1. The multiport quantizer selects the quantized sequence in such a way that the following terms are simultaneously minimized: (1) the in-band portion of the signal quantization error, and (2) the in-band portion of each of a selected subset of the terms in the Volterra series.

Because the mechanism used to cancel the NLISI is the same mechanism that initially generates the NLISI, the cancellation process does not require knowledge of the coefficient for each term in the model for NLISI. Only the algebraic form of each term must be known.

According to a first aspect of the present invention, a method for spectrally shaping nonlinear intersymbol interference (NLISI) in an oversampling digital-to-analog converter causing energy associated with NLISI to fall outside a signal band is disclosed, the method comprising the steps of: receiving a multiple bit digital input signal in said signal band; providing a quantized representation of said multiple bit digital input signal; providing a first-order shaper circuit for shaping quantization noise; providing at least one higher-order shaper circuit so as to spectrally shape NLISI; and changing said quantized representation based on said first order shaper circuit and said at least one higher-order shaper circuit, thereby reducing NLISI energy level present in said signal band.

According to a second aspect, an oversampling multi-bit digital to analog converter for converting a multi-bit converter digital input to an analog converter output is disclosed, comprising: a digital signal processor that spectrally shapes quantization noise using delta-sigma modulation, the digital signal processor comprising a first order shaper circuit for shaping quantization noise; a unitary digital-to-analog converter connected to the digital signal processor; and an analog filter connected to the unitary digital-to-analog converter, wherein the digital signal processor comprises a multiport quantizer converting a plurality of multi-bit multiport inputs to a single-bit multiport output, and wherein the digital signal processor comprises at least one higher-order shaper circuit to spectrally shape nonlinear intersymbol interference (NLISI).

According to a third aspect, an oversampling digital-to-analog converter is disclosed, comprising: a first digital filter having a first digital filter input and a first digital filter output, said first digital filter being for filtering an input signal having a signal band; a second digital filter having a second digital filter input and a second digital filter output, said second digital filter being for filtering a quantized signal; a summing element having a summing element output, said summing element for summing said first digital filter output with said second digital filter output wherein said second digital filter and said summing element form a first order shaper circuit, said summing element being a first order bias signal; at least one higher-order shaper circuit, said at least one higher-order shaper circuit generating a higher-order bias signal, said higher-order bias signal indicating magnitude of a portion of nonlinear intersymbol interference (NLISI) falling in the signal band; a multiport quantizer having a plurality of multiport quantizer inputs and a multiport quantizer output, said plurality of multiport quantizer inputs comprising said first order bias signal and said higher-order bias signal; a feedback loop for connecting said multiport quantizer output to said first digital filter input and to said at least one higher-order shaper circuit; a unit element digital-to-analog converter having a unit element digital-to-analog converter output, said unit element digital-to-analog converter being connected with said multiport quantizer output; and a continuous time filter connected to said digital-to-analog converter output.

The teachings of the present invention can be applied to any oversampling delta-sigma DAC for which NLISI is a performance-limiting factor.

For the sake of simplicity, the present invention will be described with reference to an oversampling DAC with a single bit quantizer, i.e. a quantizer having a single-bit output. However, as will be evident to those skilled in the art, the invention is also applicable to oversampling DACs with multi-bit quantizers.

BRIEF DESCRIPTION OF THE DRAWINGS

The present invention will be understood and appreciated more fully from the following detailed description taken in conjunction with the drawings in which.

DETAILED DESCRIPTION OF THE INVENTION

Figure 1:
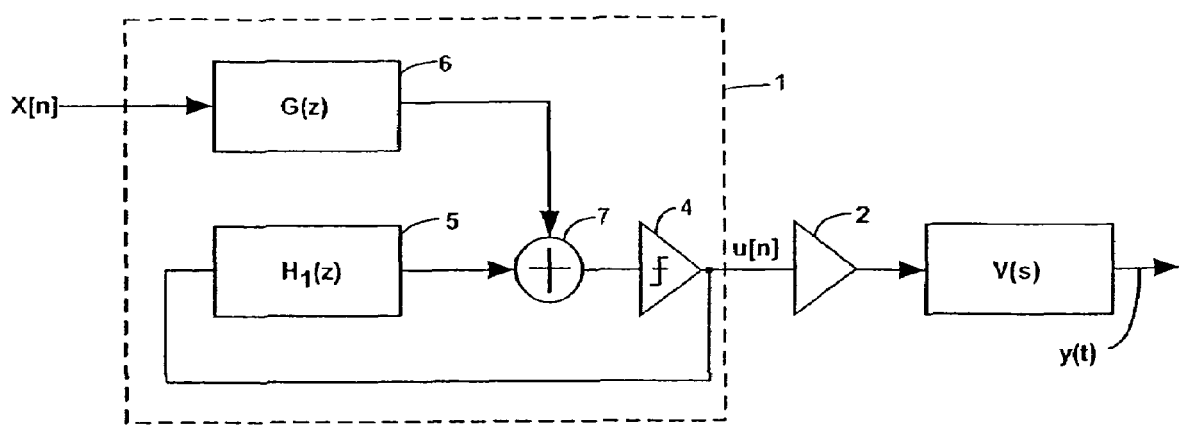
FIG. 1, already described, shows a schematical diagram of a prior art oversampling DAC.
Figure 2:
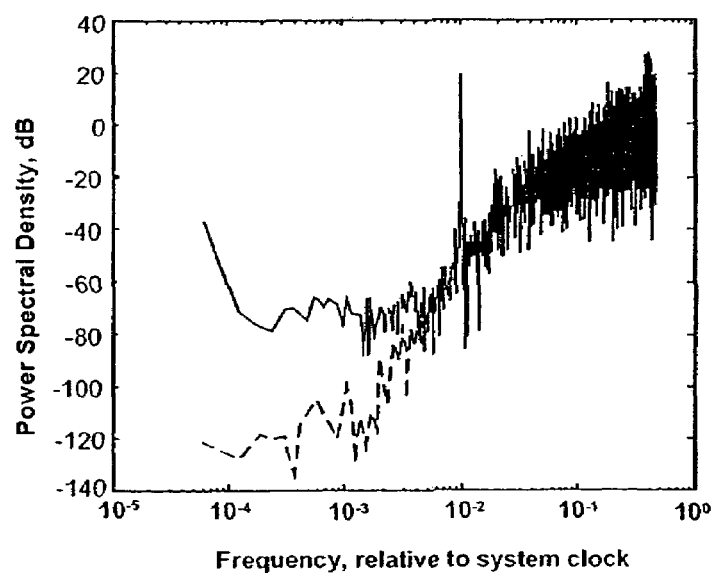
FIG. 2, already described, shows a simulated output frequency spectrum of the DAC of FIG. 1.
Figure 3:
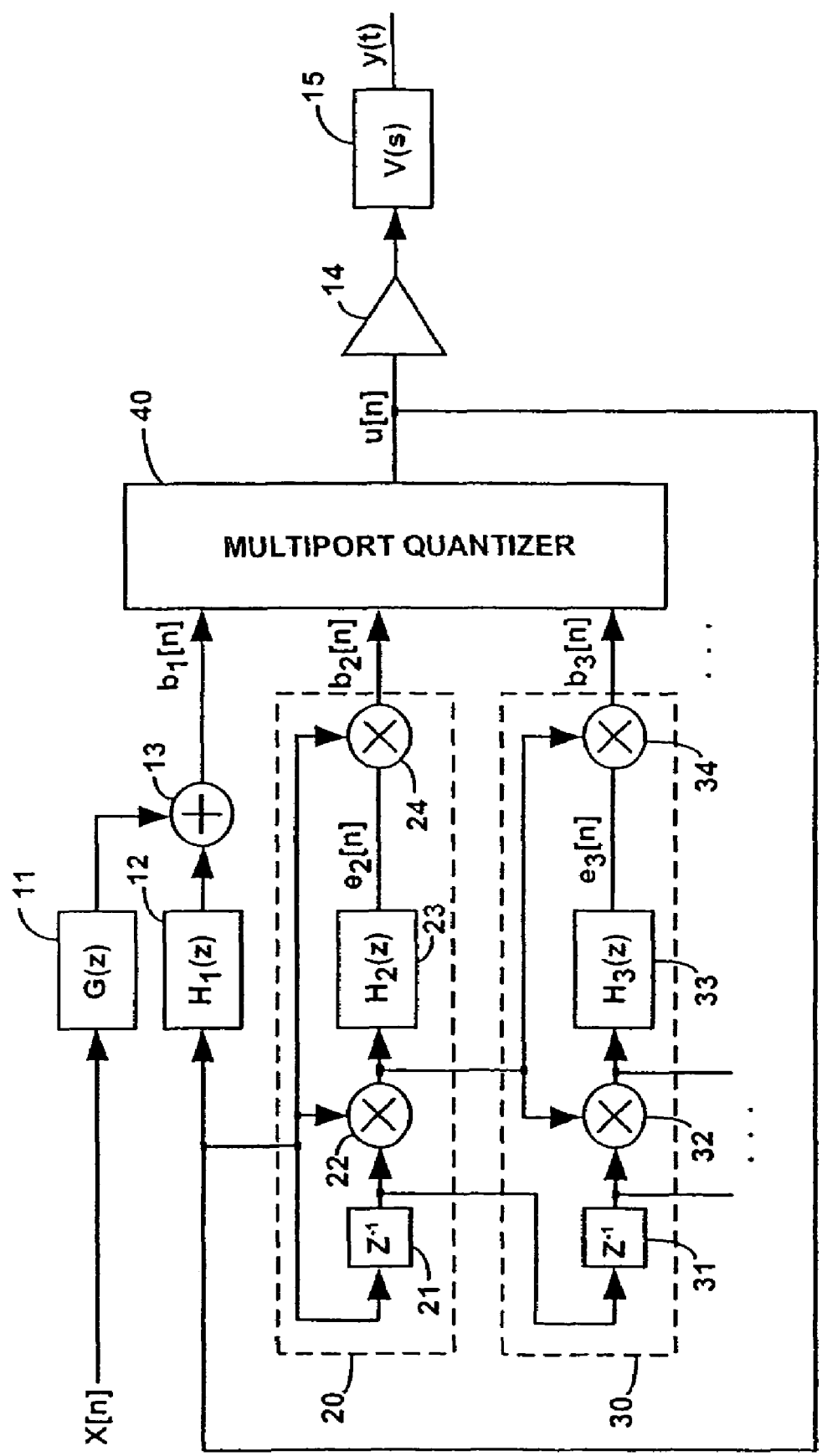
FIG. 3 shows a schematical diagram of a DAC according to the present invention.

FIG. 3 shows, schematically, the preferred embodiment of the present invention. A delta-sigma modulator, as discussed above, is modified to include NLISI shaper circuits into the feedback loop. Some of the elements correspond to those already described to the prior art embodiment: first and second digital filtering elements 11 and 12, a summing element 13, a unit element DAC 14, and a continuous time filter 15. Exemplary expressions of the transfer functions $G(z)$ and $H_1(z)$ can be found in Norsworth, Schreier & Temes, already cited above, pp. 142-152.

However, the embodiment of FIG. 3 shows shaper circuits not present in the prior art. These may include one or more of the following: a shaper circuit 20 for spectrally shaping second-order NLISI, a shaper circuit 30 for spectrally shaping third-order NLISI, and shaper circuits for shaping higher orders of NLISI (not shown in the figure). It should be noted that NLISI starts at the second order. First-order intersymbol interference is linear intersymbol interference, and does not significantly affect the performance of an oversampling DAC.

At time t=0, a multi-bit digital input signal x[n] is passed into the first digital filtering element 11 for spectral shaping the input signal. It passes through the summer 13 and into a multi-port quantizer 40. The multi-port quantizer 40 quantizes the multi-bit digital signal x[n] providing a quantized signal u[n]. The quantized signal u[n], for purposes of this explanation, is a single bit representation of the multi-bit digital signal x[n].

At time t>0, the sampled representation u[n] is fed, via a feedback loop, into a plurality of shaper circuits. A first shaper circuit comprises the second digital filtering element 12 and allows spectral shaping of the quantization noise generated as a result of the multiport quantizer 40. A second shaper circuit 20 comprises a first delay element 21, a first multiplier element 22, a third digital filtering element 23 and a second multiplier element 24. The second shaper circuit 20 provides spectral shaping of second-order NLISI. The first delay element 21, for example a flip-flop, remembers the previous value of the one-bit quantized signal, u[n−1]. The first multiplier element 22, for example an exclusive-or gate, calculates the product u[n]·u[n−1]. This product, scaled by a factor "d", represents second-order NLISI. The third digital filter element 23 isolates the portion of second-order NLISI energy within the signal band. The second multiplier element 24 generates a bias signal $b_2[n]$ with the appropriate sign. Also the "e" and "f" factors of the Volterra model can be computed, if desired. Such factors are less significant than the "d" factor, because they represent the effect of a sample further back in time, and will not be described in detail in the present specification.

A third shaper circuit 30 is depicted in FIG. 3 comprising of a second delay element 31, a third multiplier element 32, a fourth digital filtering element 33 and a fourth multiplier element 34. The third shaper circuit 30 provides spectral shaping of third-order NLISI. The delayed value of the one-bit quantized signal from the second order NLISI shaper circuit 20 is delayed a second time by the second delay element 31. The twice delayed signal is passed to the third multiplier element 32 where it is multiplied with the output of the second multiplier element 22. The product of the twice delayed signal and the second multiplier element output represents third-order NLISI, when scaled by a Volterra factor. The output of the third multiplier element 32 is passed to the fourth digital filtering element 33. The fourth digital filtering element 33 isolates the portion of the third-order NLISI energy within the signal band. The output of the fourth digital filtering element 33 is passed to the fourth multiplier element 34. The fourth multiplier element 34 generates a bias signal $b_3[n]$ with the appropriate sign.

Additional shaping circuits may be added to spectrally shape higher orders of NLISI than those shown, comprising of the same elements as the second and third shaping circuits.

The input to the third digital filtering element 23, $H_2(z)$, in shaper circuit 20 is given by u[n]·u[n−1]. In shaper circuit 30, the input to the fourth digital filtering element 33, $H_3(z)$, is given by u[n]·u[n−1]·u[n−2]. The output of the third digital filtering element 23, $H_2(z)$, is $e_2[n]$, therefore $b_2[n]= e_2[n] \cdot u[n]$. Similarly, $b_3[n]=e_3[n] \cdot u[n] \cdot u[n-1]$.

Each of the shaper circuits 12-13, 20, 30 generates a bias signal $b_i[n]$. Bias signals $b_1[n]$, $b_2[n]$, $b_3[n]$ ... are shown in FIG. 3. The bias signals $b_i[n]$ indicate (a) which of the two possible values −1 or +1 of u[n+1] would result in a reduction of the in-band error energy of the associated order, and (b) the magnitude of the NLISI error of order i. In particular, the bias signal $b_1[n]$ is associated with quantization error, and the other bias signals $b_i[n]$, i>1, are each associated with NLISI error of order i. A large negative value of $b_1[n]$, for example, indicates that setting u[n+1]=−1 would result in a reduction of the in-band energy generated by quantization noise, and that the present value of this energy is large. On the contrary, a small positive value of $b_3[n]$ indicates that setting u[n+1]=+1 would result in a reduction of the in-band energy generated by third-order NLISI, and that the present value of this energy is small.

The filter $H_1(z)$ is the same as in the prior art oversampling DAC. From Norsworth, already cited above, page 143

$$H_1(z) = \frac{H'(z) - 1}{H'(z)}$$

H'(z) is the noise transfer function, and can be computed by using the parameters that the modulator is a $3^{rd}$-order lowpass filter, having an oversampling ratio of 64 and a maximum out-of-band gain of 1.6. By applying the above parameters and formula, $$H_1(z) = \frac{0.9218z^2 - 1.467z + 0.6097}{z^3 - 2.9985z^2 + 2.9985z - 1}$$

The filters $H_2(z)$ and $H_3(z)$ can be designed in the same way as the filter H1(z). The filters $H_2(z)$ and $H_3(z)$ will typically have lower order than the main filter $H_1(z)$. For example, for a first order filter the pole can be placed at z=1:

$$H_2(z) = 1/(z - 1). \qquad (2)$$

For a higher order filter, it is better to space the poles over the passband. See Norsworth, already cited above, pp. 141-164.

The value of u[n] is determined based on all of the bias signals $b_i[n]$. This determination is made by the multiport quantizer 40. The output of the multiport quantizer 40 is chosen based on the sign of the sum of the bias signals $b_i[n]$.

Figure 4:
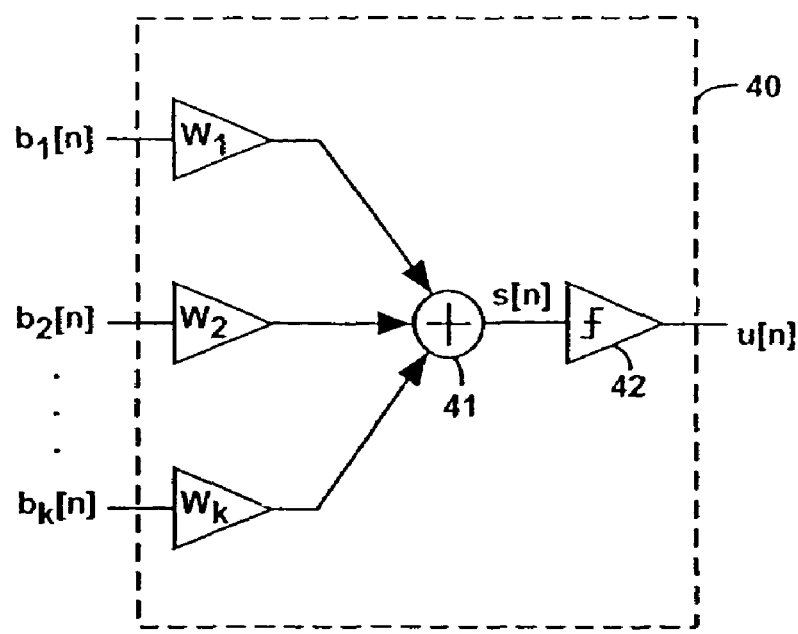
FIG. 4 shows a first embodiment of the multiport quantizer used in accordance with the present invention.
Figure 5:
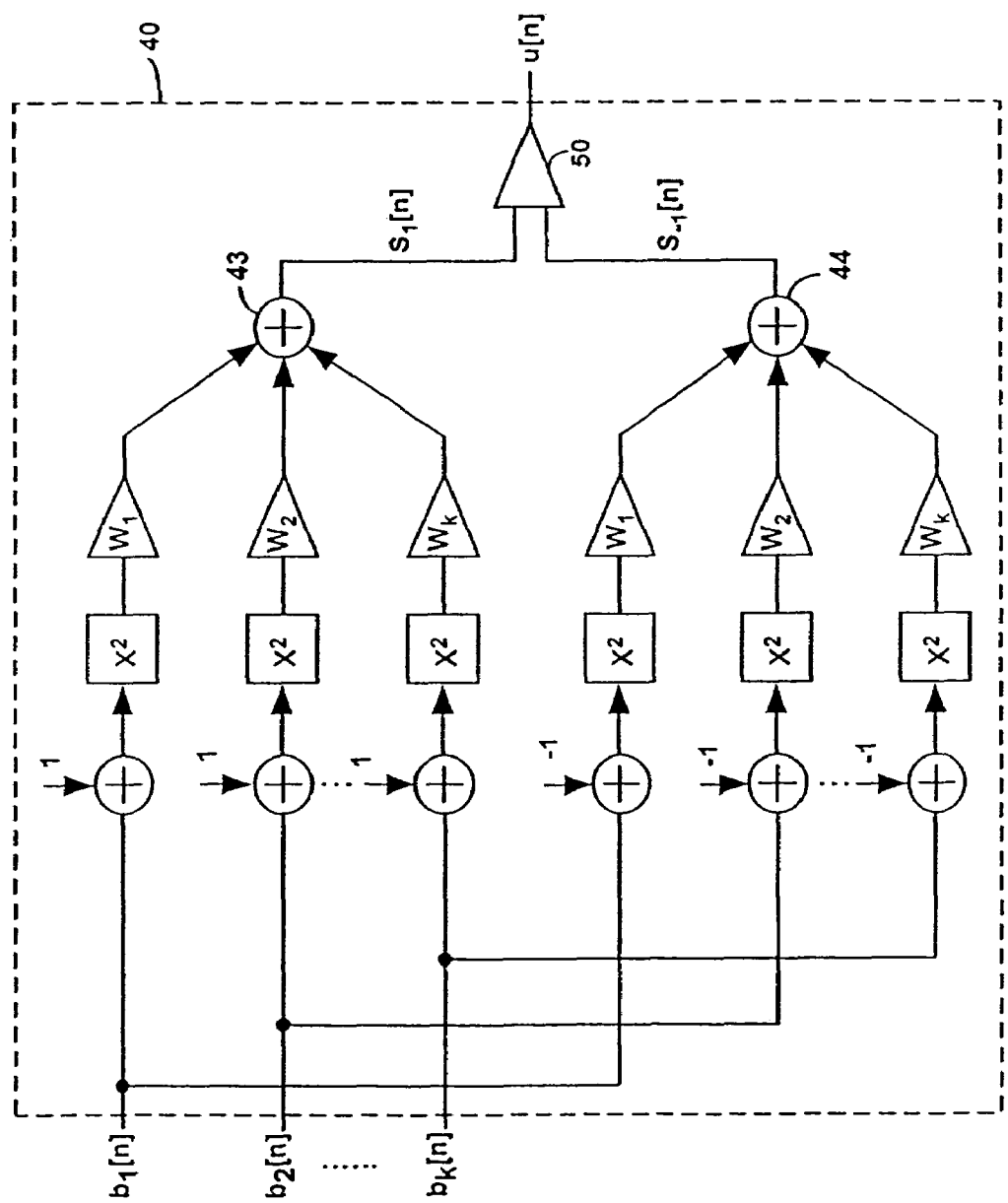
FIG. 5 shows a second embodiment of the multiport quantizer used in accordance with the present invention.

FIGS. 4 and 5 show two different embodiments of the multiport quantizer 40 used in accordance with the present invention.

FIG. 4 shows one embodiment of the multiport quantizer 4. In this embodiment, each of the inputs $b_i[n]$ is multiplied by a weight $w_i$. The resulting products are then summed together in a summer 41. The output u[n] is selected based on the sign of the resulting sum s[n]. If s[n] is positive, an output of u[n]=1 is generated. If s[n] is negative, an output of u[n]=−1 is generated by means of a single-port quantizer 42. The probability of an exact zero value for the sum is very small, so that the behavior of the quantizer 40 with exactly zero input is not relevant.

The magnitude of the weights $w_i$ determines how much importance is placed on minimizing the error in the quantization of each input. A larger weight means that more importance is given to minimizing the quantization error for the corresponding input. Typical weights would be $w_1=1$, $w_2=0.1$, $w_3=0.1$, assigning ten times more importance to minimizing quantization noise then to minimizing NLISI.

The multiport quantizer of the embodiment of FIG. 4 has the property that the sum of the absolute values of the quantization errors, weighted by the corresponding weights, $$w_1 abs(u[n]-b_1[n])+w_2 abs(u[n]-b_2[n])+ \ldots +w_k abs(u[n]-b_k[n]) \quad (3)$$

is minimized.

FIG. 5 shows a second, preferred, embodiment of the multiport quantizer 4. In this embodiment, each of the inputs $b_i[n]$ is applied to two distinct signal paths. In each path, a "tentative" quantization error for the corresponding input is calculated. For the first path, the tentative quantization error is calculated assuming $u[n]=1$. In the second path, the tentative quantization error is calculated assuming $u[n]=-1$. The quantization error for each input is squared and then multiplied by a weight $w_i$. The resulting weighted squared errors $s_1[n]$ and $s_{-1}[n]$ are then summed together in summers 43, 44, respectively, to obtain a total squared tentative quantization error for each of the two tentative decisions.

The output u[n] is selected based on which path has the lower total squared tentative quantization error. If the total squared tentative quantization error $s_1[n]$ assuming a 1 output is lower, an output of $u[n]=1$ is generated. Otherwise, an output of $u[n]=-1$ is generated. The decision is made by a comparator circuit 50. The probability of an exact tie is very small, so that the behavior of the comparator with exact tie is not relevant.

The magnitude of the weights $w_i$ determine how much importance is placed on minimizing the error in the quantization of each input. A larger weight means that more importance is given to minimizing the quantization error for the corresponding input. Typical weights would be $w_1=1$, $w_2=0.1$, $w_3=0.1$.

The multiport quantizer of the embodiment of FIG. 5 has the property that the sum of the squares of the quantization errors, weighted by the corresponding weights, $$w_1(u[n]-b_1[n])^2+w_2(u[n]-b_2[n])^2+ \ldots +w_k(u[n]-b_k[n])^2 \quad (4)$$

is minimized.

Therefore, according to the present invention, both minimization of the in-band portion of the signal quantization error and minimization of the in-band portion of each of a selected subset of the terms in the Volterra series are obtained.

Under certain assumptions, it can be demonstrated analytically that the invention spectrally shapes NLISI of the i-th order with a transfer function of $$W_i(z) = \frac{1}{1 - H_i(z)}. \quad (5)$$

For example, with reference to FIG. 3, the term $d \cdot u[n] \cdot u[n-1]$ in the Volterra series can be considered. This term is shaped by the first shaper circuit 20 in FIG. 3. The shaper circuit 20 first calculates the product $u[n] \cdot u[n-1]$ using the multiplier 22, then extracts the in-band portion of the product $u[n] \cdot u[n-1]$ using the filter 23. The in-band portion of the product $u[n] \cdot u[n-1]$ is minimized using multiplier 24 and multiport quantizer 40.

The output of filter 23 is indicated in FIG. 3 as $e_2[n]$. The operation of the multiplier 24 can be described as:

$$b_2[n]=e_2[n] \cdot u[n] \quad (6)$$

Multiplying both sides of equation (6) by u[n] gives $$b_2[n] \cdot u[n]=e_2[n] \quad (7)$$

where the fact that $u[n]=1$ or $-1$ has been used, implying that u[n] squared is 1.

The operation of the multiport quantizer can be described as $$u[n]=b_2[n-1]+Q_2[n] \quad (8)$$

where $Q_2[n]$ represents the quantization error in quantizing $b_2[n]$. It should be noted that since the quantizer has multiple ports, $Q_2[n]$ has some dependence on the value of the other inputs to the multiport quantizer ($b_1[n]$, $b_3[n]$, ...). The simulations performed by the inventors have shown that $Q_2[n]$ and the other $Q_k[n]$ are approximately white with an approximately Gaussian distribution for a wide range of input signal types.

Solving equation (8) for $b_2[n-1]$ gives:

$$b_2[n-1]=u[n]-Q_2[n] \quad (9)$$

Adjusting the indices and substituting $b_2[n-1]$ from equation (9) into equation (7) gives $$e_2[n-1]=u[n] \cdot u[n-1]-Q_2[n] \cdot u[n-1] \quad (10)$$

If the z-transform of the product signal $u[n] \, u[n-1]$ is denoted by $r_2(z)$ and the z-transform of the product $Q_2[n] \cdot u[n-1]$ is denoted by q[z], then the closed-loop operation of shaper circuit 20 can be described in the z domain as $$H_2(z) \cdot r(z)=r(z)-q(z) \quad (11)$$

where the fact that $e_2(z)=H_2(z) \cdot r(z)$ has been used. Solving equation (11) for r(z) gives $$r(z)=q(z)/(1-H_2(z)) \quad (12).$$

What this analysis shows is that the spectrum of the product signal $r[n]=u[n] \cdot u[n-1]$ is spectrally shaped by a factor of $1/(1-H_2(z))$.

The applicants have found in simulation that the spectrum $Q_2[n] \cdot u[n-1]$ is approximately white. If $H_2(z)$ is a lowpass filter, then the spectrum of the product $u[n] \cdot u[n-1]$ will have most of its power at higher frequencies, outside of the signal band. This implies that the term of the Volterra series $d \cdot u[n] \cdot u[n-1]$ will also have most of its power at higher frequencies, outside of the signal band. There is no need to know the value of d in order for the shaper to operate.

Behavioral simulations have been performed with Matlab® and Simulink® to demonstrate the functionality and effectiveness of the invention. Some of the configurations simulated and the results obtained are summarized in Table 1.

TABLE 1

| Config Number | Order of H1(z) | Order of H2(z) | Order of H3(z) | Prior-art SNR | Ideal SNR | Invention SNR |
|---|---|---|---|---|---|---|
| 1 | 2 | 2 | 2 | 54 | 98 | 79 |
| 2 | 2 | 2 |   | 54 | 98 | 79 |
| 3 | 3 | 2 |   | 51 | 117 | 102 |

The first column of the table is an index number used to identify each configuration. This means that table 1 takes into account three different configurations. The second column of table 1 represents the order of the transfer function $H_1(z)$ that shapes the quantization noise. The third column of table 1 represents the order of the transfer function $H_2(z)$ that shapes second-order NLISI. The fourth column of table 1 represents the order of the transfer function $H_3(z)$ that shapes third-order NLISI. For those rows in which the fourth column is left blank, third-order NLISI is not shaped and is omitted from the simulation. The fifth column of table 1 represents the simulated signal-to-noise ratio achieved by the prior-art modulator. The sixth column of table 1 represents the ideal signal-to-noise ratio in the absence of NLISI. The seventh column of table 1 represents the simulated signal-to-noise ratio (SNR) achieved by the invention. The SNR (quotient of the signal power and the noise power) is calculated by applying a sine-wave input to the modulator and looking at the spectrum of the output. The signal power is calculated by adding the output signal power in the three bins determined by the frequency of the input sine wave. The noise power is calculated by integrating the output power over all the other bins in the signal band, not including the bins containing the input signal.

Figure 6:
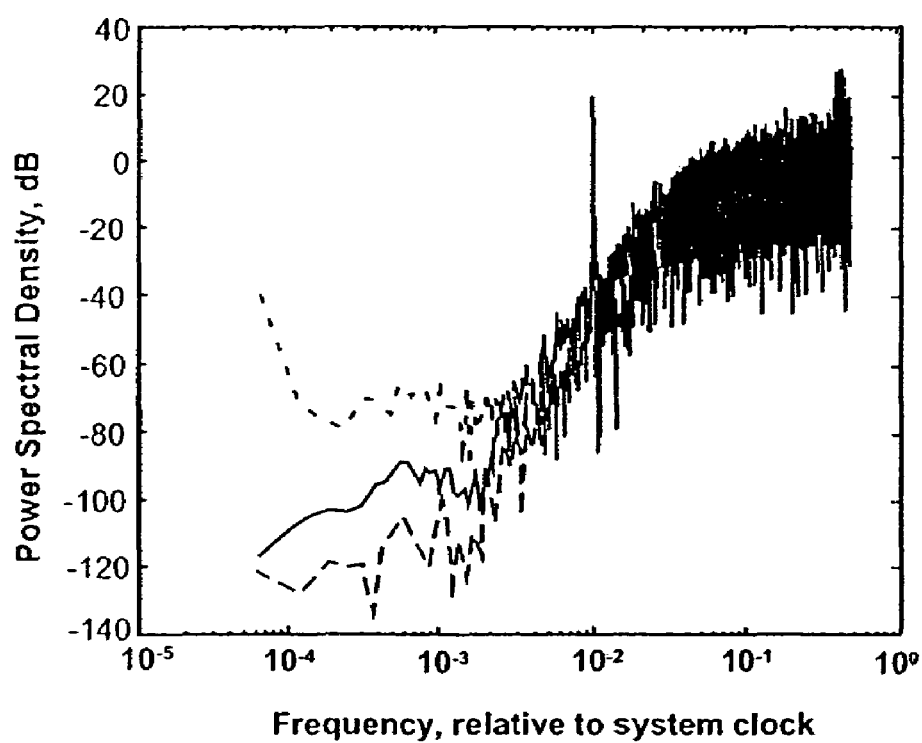
FIG. 6 shows a simulated output frequency spectrum of the DAC of FIG. 3.

FIG. 6 illustrates in greater detail the simulation results using configuration number 3 of Table 1. Each curve in the graph represents the output spectrum of a simulated DAC implementation. The solid curve represents the invention, the dashed curve represents the prior art DAC and the dotted curve represents an ideal DAC with no NLISI.

While several illustrative embodiments of the invention have been shown and described, numerous variations and alternative embodiments will occur to those skilled in the art. Such variations and alternative embodiments are contemplated, and can be made without departing from the spirit and scope of the invention as defined in the appended claims.

What is claimed is:

1. A method for spectrally shaping nonlinear intersymbol interference (NLISI) in an oversampling digital-to-analog converter causing energy associated with NLISI to fall outside a signal band, the method comprising the steps of:
   receiving a multiple bit digital input signal in said signal band;
   providing a quantized representation of said multiple bit digital input signal;
   providing a first-order shaper circuit for shaping quantization noise;
   providing at least one higher-order shaper circuit so as to spectrally shape NLISI; and
   changing said quantized representation based on said first order shaper circuit and said at least one higher-order shaper circuit, thereby reducing NLISI energy level present in said signal band.

2. The method of claim 1, wherein the step of providing at least one higher-order shaper circuit comprises the steps of:
   calculating said NLISI based on a Volterra model, said Volterra model having at least one term to generate a calculated signal;
   filtering said calculated signal to generate a filtered signal; and
   providing a bias signal based on said filtered signal.

3. The method of claim 2, wherein the step of calculating said NLISI comprises the steps of:
   delaying said quantized representation, thus providing a delayed signal;
   multiplying said quantized representation and said delayed signal, thus providing a product signal;
   and wherein the step of providing a bias signal comprises the step of
   multiplying said filtered signal by said quantized representation.

4. The method of claim 1, wherein said quantized representation is a single-bit representation.

5. An oversampling multi-bit digital to analog converter for converting a multi-bit converter digital input to an analog converter output, comprising:
   a digital signal processor that spectrally shapes quantization noise using delta-sigma modulation, the digital signal processor comprising a first order shaper circuit for shaping quantization noise;
   a unitary digital-to-analog converter connected to the digital signal processor; and
   an analog filter connected to the unitary digital-to-analog converter,
   wherein the digital signal processor comprises a multiport quantizer converting a plurality of multi-bit multiport inputs to a single-bit multiport output, and
   wherein the digital signal processor comprises at least one higher-order shaper circuit to spectrally shape nonlinear intersymbol interference (NLISI).

6. The converter of claim 5, wherein the multiport quantizer comprises:
   a plurality of weights ($w_1, w_2 \ldots w_k$), to be multiplied by each input of the plurality of multi-bit multiport inputs, thus forming a plurality of weighted products;
   a multiport summer, to sum the plurality of the weighted products; and
   a quantizer, to provide the single-bit multiport output, the sign of the single-bit multiport output depending on the sign of the plurality of the weighted products.

7. The converter of claim 5, wherein the multiport quantizer comprises:
   a first plurality of summers, wherein each input of the plurality of multi-bit multiport inputs is summed to a positive value, thus obtaining a first plurality of tentative quantization errors;
   a second plurality of summers, wherein each input of the plurality of multi-bit multiport inputs is summed to a negative value, thus obtaining a second plurality of tentative quantization errors;
   a first plurality of squaring circuits, each squaring circuit of the first plurality squaring a respective tentative quantization error of the first plurality of tentative quantization errors, thus obtaining a first plurality of squared tentative quantization errors;
   a second plurality of squaring circuits, each squaring circuit of the second plurality squaring a respective tentative quantization error of the second plurality of tentative quantization errors, thus obtaining a second plurality of squared tentative quantization errors;
   a first multiport summer, to sum the first plurality of squared tentative quantization errors;
   a second multiport summer, to sum the second plurality of squared tentative quantization errors; and
   a comparator, to compare the first plurality of squared tentative quantization errors with the second plurality of tentative quantization errors and to provide the single-bit multiport output.

8. The converter of claim 7, wherein the sign of the single-bit multiport output is positive if the first plurality of squared tentative quantization errors is greater than the second plurality of squared tentative quantization errors and is negative if the second plurality of squared tentative quantization errors is greater than the first plurality of squared tentative quantization errors.

9. The converter of claim 5, wherein said at least one higher-order shaper circuit comprises:
   a delay element to remember a previous value of the single-bit multiport output;
   a first multiplier element connected to the delay element and calculating a product proportional to an order of nonlinear intersymbol interference corresponding to the order of the higher-order shaper circuit;
   a digital filtering element to spectrally shape the product calculated by the first multiplier element; and
   a second multiplier element connected to the digital filtering element and generating a bias signal, said bias signal forming a multi-bit multiport input of the plurality of the multi-bit multiport inputs.

10. The converter of claim 5, wherein higher i-order NLISI is spectrally shaped with a transfer function $W_i(z) = 1/(1-H_i(z))$ and wherein $H_i(z)$ indicates a transfer function of a higher i-order digital filtering element.

11. An oversampling digital-to-analog converter comprising:
   a first digital filter having a first digital filter input and a first digital filter output, said first digital filter being for filtering an input signal having a signal band;
   a second digital filter having a second digital filter input and a second digital filter output, said second digital filter being for filtering a quantized signal;
   a summing element having a summing element output, said summing element for summing said first digital filter output with said second digital filter output wherein said second digital filter and said summing element form a first order shaper circuit, said summing element being a first order bias signal;
   at least one higher-order shaper circuit, said at least one higher-order shaper circuit generating a higher-order bias signal, said higher-order bias signal indicating magnitude of a portion of nonlinear intersymbol interference (NLISI) falling in the signal band;
   a multiport quantizer having a plurality of multiport quantizer inputs and a multiport quantizer output, said plurality of multiport quantizer inputs comprising said first order bias signal and said higher-order bias signal;
   a feedback loop for connecting said multiport quantizer output to said first digital filter input and to said at least one higher-order shaper circuit;
   a unit element digital-to-analog converter having a unit element digital-to-analog converter output, said unit element digital-to-analog converter being connected with said multiport quantizer output; and
   a continuous time filter connected to said digital-to-analog converter output.

12. The converter of claim 11, wherein said higher-order bias signal indicates magnitude of a second order product of said NLISI.

13. The converter of claim 11, further comprising a second higher-order shaper circuit for generating a second higher-order bias signal indicating a magnitude of a third order product of said NLISI.

14. The converter of claim 12 wherein said at least one shaper circuit for generating said bias signal indicating said magnitude of said second order product of said NLISI comprises:
   a first delay element, having a first delay element input and a first delay element output, said first delay element input being connected with said multiport quantizer output via said feedback loop;
   a first multiplier element having a first multiplier output, said first multiplier element for multiplying said first delay element output with said multiport quantizer output;
   a third digital filter, having a third digital filter input and a third digital filter output, said third digital filter being connected with said first multiplier element output, said third digital filter for isolating said second order product of said NLISI; and
   a second multiplier element having a second multiplier element output, said second multiplier element for multiplying said third digital filter output with said multiport quantizer output, said second multiplier element output being connected with one input of said multiport quantizer, said second multiplier output providing said higher-order bias signal indicating said magnitude of said second order product of said NLISI.

15. The converter of claim 14, further comprising a second higher-order shaper circuit for generating a second higher-order bias signal indicating magnitude of a third order product of said NLISI.

16. The converter of claim 15, wherein said second higher-order shaper circuit comprises:
   a second delay element having a second delay element input and a second delay element output, said second delay element input being connected with said first delay element output;
   a third multiplier element having a third multiplier element output, said third multiplier element for multiplying said second delay element output with said first multiplier element output;
   a fourth digital filter having a fourth digital filter input and a fourth digital filter output, said fourth digital filter input being connected with said third multiplier element output for isolating said third order product of said NLISI; and
   a fourth multiplier element having a fourth multiplier element output, said fourth multiplier element for multiplying said fourth digital filter output with said first multiplier element output.

17. The converter of claim 16, wherein said fourth multiplier element output is connected to one input of said multiport quantizer for providing a bias signal indicating said magnitude of said third order product of said NLISI.

18. The converter of claim 14, wherein the third digital filter has a transfer function $H_2(z)=1/(z-1)$.

19. The converter of claim 11, further comprising additional higher-order shaper circuits for generating additional higher-order bias signals indicating magnitude of higher-order products of said NLISI.

20. The converter of claim 19, wherein each of the additional higher-order shaper circuits comprises a higher-order digital filter.

* * * * *